US010006928B1

(12) United States Patent
Hagerott et al.

(10) Patent No.: US 10,006,928 B1
(45) Date of Patent: Jun. 26, 2018

(54) AIRSPEED DETERMINATION FOR AIRCRAFT

(71) Applicant: Textron Innovations Inc., Providence, RI (US)

(72) Inventors: Steven G. Hagerott, Wichita, KS (US); Stephen M. Eddy, Derby, KS (US); Russell Peters, Colorado Springs, CO (US)

(73) Assignee: Textron Innovations Inc., Providence, RI (US)

( * ) Notice: Subject to any disclaimer, the term of this patent is extended or adjusted under 35 U.S.C. 154(b) by 299 days.

(21) Appl. No.: 15/087,026

(22) Filed: Mar. 31, 2016

(51) Int. Cl.
*G01P 5/16* (2006.01)

(52) U.S. Cl.
CPC ..................... *G01P 5/16* (2013.01)

(58) Field of Classification Search
CPC .......................................................... G01P 5/16
USPC ........................................................ 700/144
See application file for complete search history.

(56) References Cited

U.S. PATENT DOCUMENTS

| 5,297,052 | A | 3/1994 | McIntyre et al. |
| 6,273,370 | B1 | 8/2001 | Colgren |
| 6,466,888 | B1 | 10/2002 | McCool et al. |
| 6,561,020 | B2 | 5/2003 | Glenney |
| 6,722,610 | B1* | 4/2004 | Rawdon .................. B64C 25/00 244/103 |
| 8,412,389 | B2 | 4/2013 | Tessier |
| 8,914,164 | B1 | 12/2014 | Nathan et al. |
| 2007/0239326 | A1 | 10/2007 | Johnson et al. |

* cited by examiner

*Primary Examiner* — Harry W Byrne
(74) *Attorney, Agent, or Firm* — Erise IP, P.A.

(57) ABSTRACT

Embodiments of a method to determine airspeed for aircraft include determining critical air data parameters without the use of pitot-static systems. Airspeed may be determined by iteratively repeating the method until converging on a stable airspeed value that differs from a previous airspeed value by less than a predetermined threshold. Airspeed may be determined by modeling aircraft lift and repeatedly updating dynamic pressure to converge on an airspeed based on the balance between aircraft lift and weight. Airspeed may be determined based on predetermined relationships between a horizontal control surface position and dynamic pressure. A voting logic method validates or invalidates airspeeds from dissimilar sources, including airspeeds determined using the methods described herein and conventional pitot-static systems.

20 Claims, 13 Drawing Sheets

AIRSPEED DETERMINATION FOR AIRCRAFT

BACKGROUND

1. Technical Field

Embodiments of this disclosure relate generally to computing flight information for aircraft, and more specifically to determining airspeed of aircraft independent of pitot-tube information.

2. Discussion of Related Art

Aircraft typically rely on a pitot-static system that includes pressure sensitive instruments used to determine aircraft parameters such as airspeed. The pitot-static system includes a pitot-tube, a static port, an air data computer, and associated instruments such as an airspeed indicator. The pitot-tube is for example a tube with a forward facing port. As the aircraft moves forward, air rams into the port generating pressure in the pitot-tube known as pitot pressure. An increase in the aircraft's airspeed causes a corresponding increase in the pitot pressure. The static port measures static pressure, which is dependent on the aircraft's altitude. The static port is located for example on a side of an aircraft's fuselage, facing tangent to the forward direction, and therefore not exposed to pitot pressure. The air data computer determines aircraft airspeed for any altitude, based on pitot pressure and static pressure, and reports the airspeed to the airspeed indicator.

Pitot-static systems are subject to failures that may cause incorrect critical air data parameters, such as airspeed. Such a failure may be catastrophic as many pilot decisions and autopilot actions depend on critical air data parameters such as airspeed. Common mode failures of air data probes, such as pitot-tubes, may occur due to exposure to extreme in-flight conditions including ice crystals, volcanic ash, or multiple bird strikes, for example.

SUMMARY

In an embodiment, a method for aircraft airspeed determination is provided. The method includes providing a Mach number and performing an iteration. The iteration includes determining a lift coefficient from the Mach number, a flap position, and an angle of attack; determining a weight of the aircraft; determining an air density based on a pressure; determining a true airspeed based on the lift coefficient, the weight, the air density, a load factor, and a wing surface area; and, determining an updated Mach number based on the true airspeed and a static air temperature. The method further includes comparing a difference between the Mach number and the updated Mach number to a predetermined threshold; repeating the steps of the iteration until the difference is less than the predetermined threshold; and, determining a resulting Mach number based on the updated Mach number of the iteration.

In another embodiment, a method for aircraft airspeed determination is provided. The method includes determining an initial dynamic pressure from a weight, a load factor, a wing surface area, an angle of attack, and a lift coefficient of the aircraft; determining a lift of the aircraft based on the wing surface area, the angle of attack, the lift coefficient, and the initial dynamic pressure; determining an error value based on a difference between the lift and the weight; determining an updated dynamic pressure that reduces the error value; repeating the steps of determining the lift, determining the error value, and determining the updated dynamic pressure until the error value is less than a predetermined threshold; and determining aircraft airspeed based on the updated dynamic pressure and an air density.

In yet another embodiment, a method for aircraft airspeed determination, is provided. The method includes determining at least one horizontal control surface position; determining a Mach number based on an initial Mach number and an altitude; determining a dynamic pressure based on an air density, the Mach number, and the at least one horizontal control surface position; determining an airspeed based on the dynamic pressure; and, determining an updated Mach number based on the airspeed.

In yet another embodiment, a method to determine an airspeed for an aircraft, is provided. The method includes providing at least one measured airspeed determined from a pitot-tube; providing a derived airspeed; and, determining a valid airspeed from the at least one measured airspeed and the derived airspeed.

DETAILED DESCRIPTION

Figure 1:
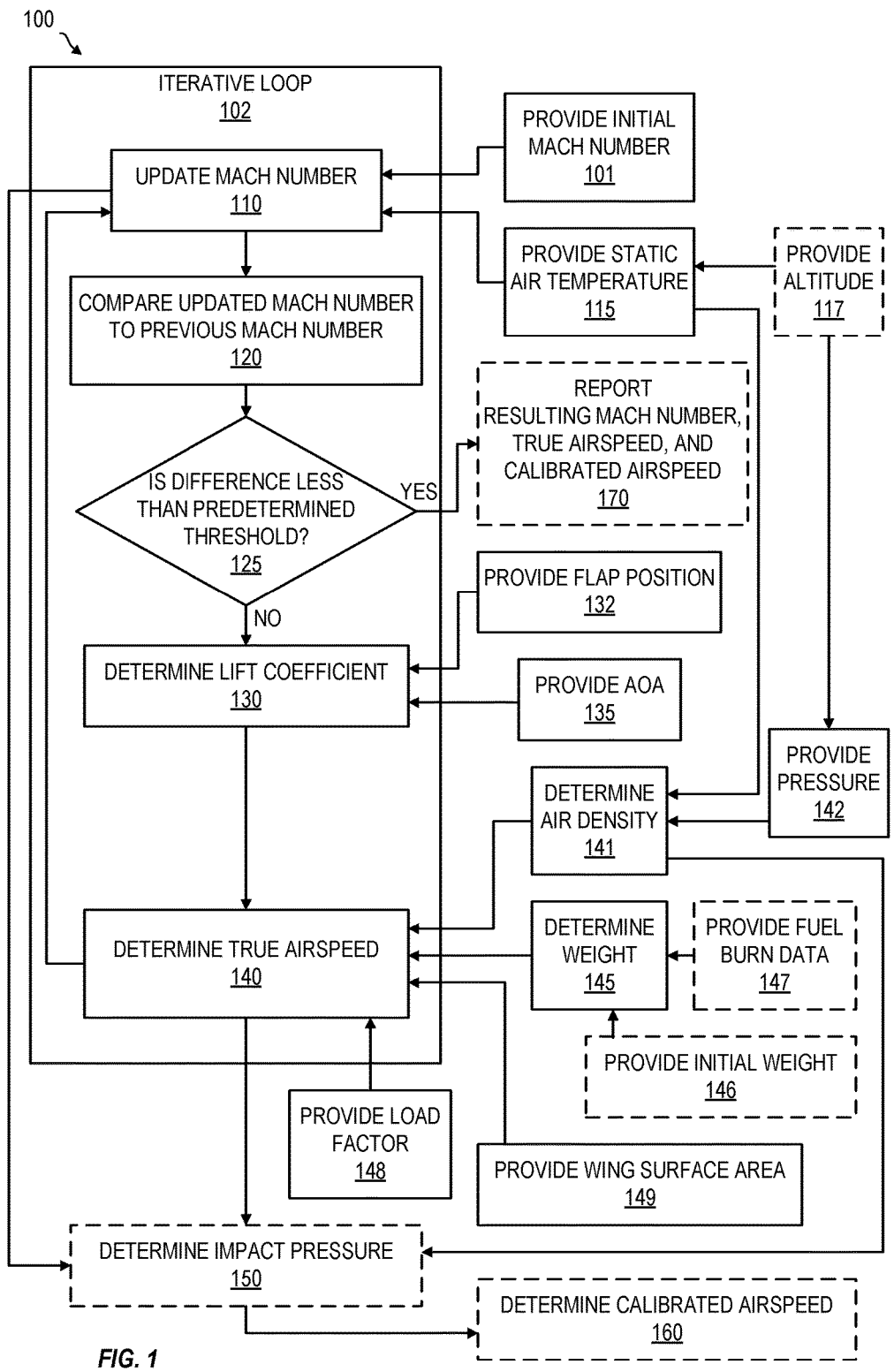
FIG. 1 is a block diagram of a method to determine synthetic air data parameters including airspeed for an aircraft, in an embodiment.
Figure 2:
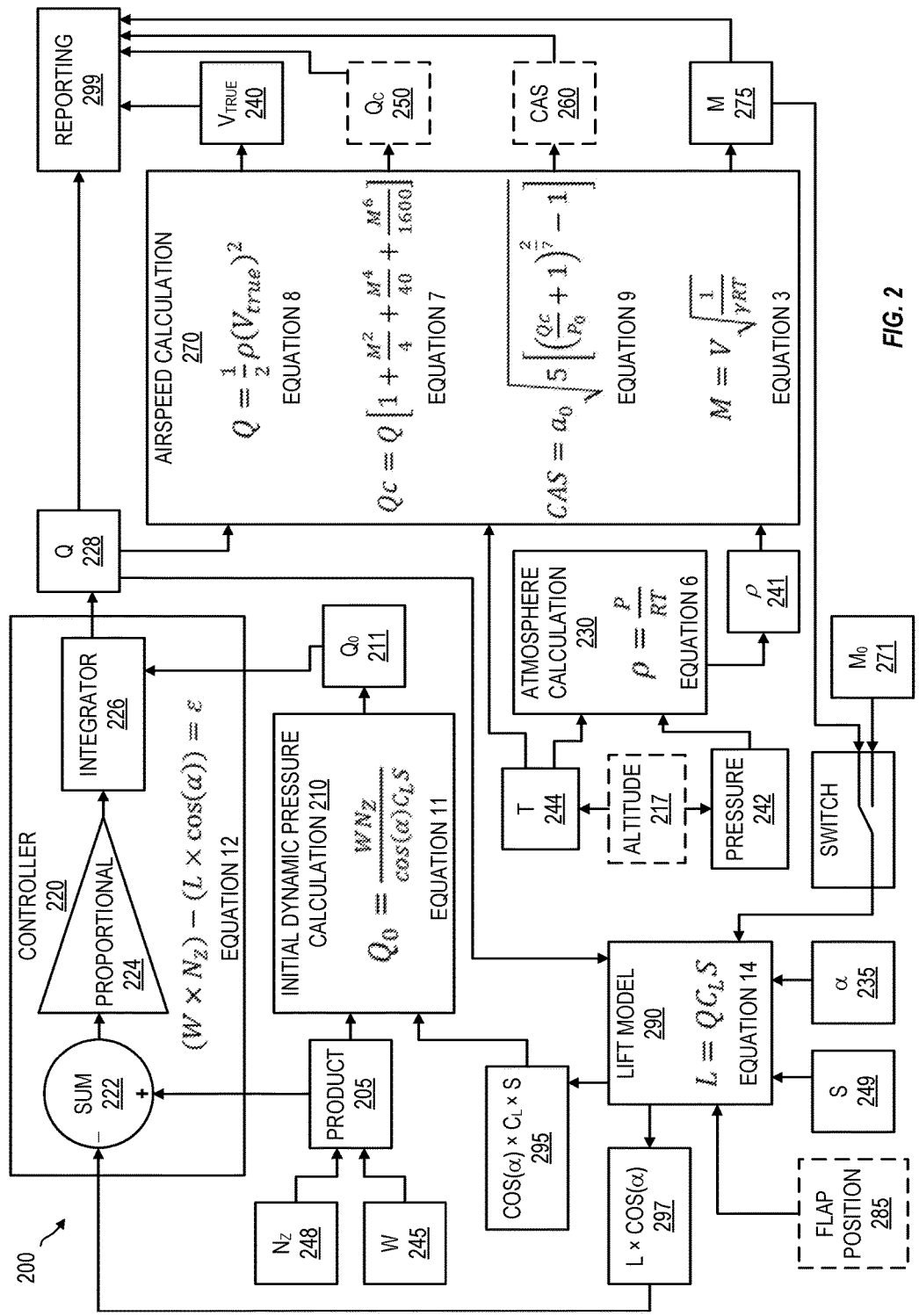
FIG. 2 is a block diagram of a method to determine synthetic air data parameters including airspeed for an aircraft, in an embodiment.
Figure 3:
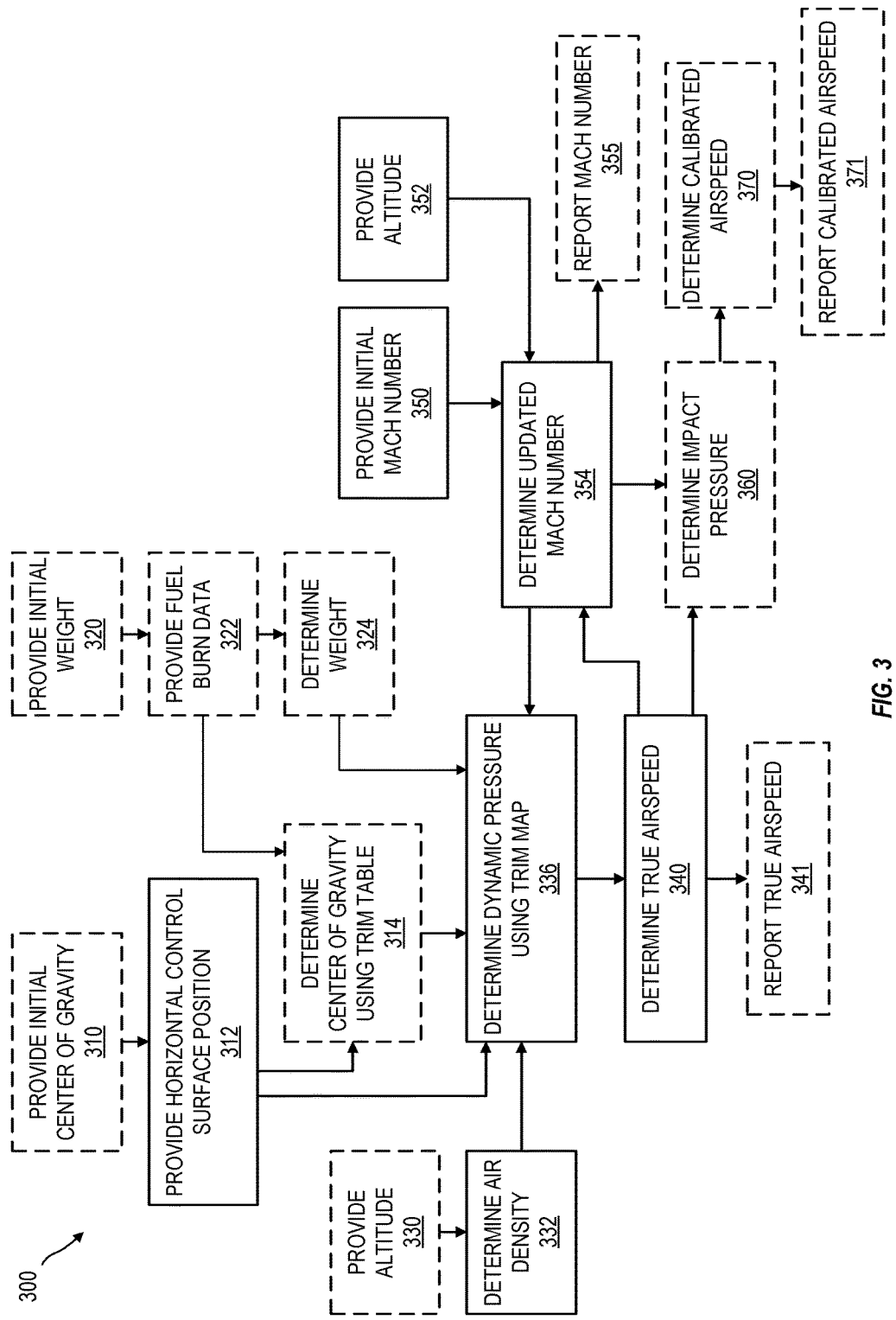
FIG. 3 is a block diagram of another method to determine synthetic air data parameters including airspeed for an aircraft, in an embodiment.

Embodiments of the present disclosure provide alternate critical air data parameters using dissimilar methods 100, 200, and 300 of FIGS. 1, 2, and 3, respectively, without the use of pitot-static systems. The alternate air data parameters are derived from aircraft parameters and standard values to provide a set of "synthetic" air data parameters (e.g., airspeed, air density, impact pressure, and Mach number) that can be used by the crew or by critical systems, such as fly-by-wire, to vote out common mode failures.

In the event that a pitot-tube failure occurs, a method is needed to determine which air data parameters are faulty so that the synthetic air data parameters may be used instead. Embodiments of the present disclosure include an electronic voting method (see e.g., method 400, FIG. 4) used to determine which air data parameters are faulty. The voting method and synthetic parameters provide a level of safety to detect air data failures and vote those failures out in favor of synthetic parameters before flight control operations occur with incorrect air data.

FIG. 1 is a block diagram of a method 100 for airspeed determination for aircraft using synthetic air data parameters. Method 100 includes an iterative loop 102 for repeating steps 110, 120, 125, 130, and 140, described below, until converging to a stable airspeed value. Method 100 determines a Mach number, which is a nondimensional ratio of air velocity to the speed of sound, as shown in Equation 1:

$$M = V/a \qquad \text{Equation 1:}$$

In Equation 1, M is a Mach number, V is an air velocity, and a is a speed of sound. Method 100 uses an initial Mach number estimate and iteratively converges to a resulting Mach number, as described below. Based on the resulting Mach number, method 100 determines a true airspeed. Method 100 is for example executed by an air data computer onboard the aircraft. The air data computer is for example a computer having a memory, including a non-transitory medium for storing instructions, and a processor for executing the instructions.

Method 100 assumes that the true Mach number is unknown and computes Mach number based on air parameters and aircraft parameters. However, some parameters may require a Mach number to compute. For example, determining a lift coefficient requires a Mach number in step 130, described below. Therefore, an initial Mach number is provided until a first iteration of method 100 produces an updated Mach number.

In step 101, an initial Mach number is provided. The initial Mach number is for example an intermediate value determined from historical flight data. In an example of step 101, an initial Mach number of 0.65 is provided.

In step 110, a Mach number is updated. During the first iteration of iterative loop 102, the Mach number is the initial Mach number provided in step 101. During subsequent iterations of iterative loop 102, the Mach number is updated using Equation 1, above.

Air velocity, V, is a speed of the aircraft relative to the air in which it is flying, which is also called true airspeed (TAS). The speed of sound, a, is determined from Equation 2:

$$a = \sqrt{\gamma R T} \qquad \text{Equation 2:}$$

In Equation 2, a is the speed of sound, $\gamma$ is a ratio of the specific heat at constant pressure to the specific heat at constant volume ($\gamma=1.4$ for air), R is the gas constant, and T is a static air temperature. Substituting Equation 2 into Equation 1 provides Equation 3:

$$M = V\sqrt{\frac{1}{\gamma R T}} \qquad \text{Equation 3}$$

In step 115, an absolute static air temperature, T, is provided for Equation 3. Static air temperature may either be measured at the static port or estimated from a lookup table of standard static air temperatures for given altitudes. Measurement of outside air temperature at the static port is less prone to failure compared to measuring dynamic pressure with a forward facing pitot tube because the static port is less likely to become clogged from for example debris during flight. As an alternative to measuring temperature, altitude is optionally provided in step 117 for estimating static air temperature from a standard lookup table. In an example of step 117, Global Positioning Satellite (GPS) information is used to provide altitude.

In step 120, the Mach number from step 110 is compared to a previously determined Mach number to determine a difference. Initially, step 120 is skipped because only the initial Mach number is available. During the first iteration of iterative loop 102, a first updated Mach number is compared to the initial Mach number to determine a first difference. During a second iteration of method 100, a second updated Mach number is compared to the first updated Mach number to determine a second difference, and so on.

In step 125, the difference determined in step 120 is compared to a predetermined threshold value. If the difference is less than the predetermined threshold value, the most recently updated Mach number is considered the resulting Mach number of method 100, which is optionally reported in step 170. Otherwise, method 100 continues with step 130. In an example of step 125, the difference is compared to the predetermined threshold value of 0.01 Mach.

In step 130, a lift coefficient is determined using Equation 4:

$$C_L = C_{L\alpha}\alpha + C_{Lo} \qquad \text{Equation 4:}$$

In Equation 4, $C_L$ is a lift coefficient, $\alpha$ is a calibrated aircraft angle of attack, $C_{L\alpha}$ is a lift coefficient slope of the aircraft, and $C_{Lo}$ is an aircraft lift coefficient for an angle of attack of zero degrees. The lift coefficient, $C_L$, is a dimensionless coefficient that relates lift generated by a particular aircraft to air density and velocity for a given wing surface area. Angle of attack is the angle between a wing and air flow. The calibrated aircraft angle of attack, α, includes a calibration factor to account for a difference in airflow angle at the wing compared to airflow angle at a vane used to measure angle of attack. Using Equation 4, $C_L$, is determined from $C_{Lo}$ plus $C_{L\alpha}$ times the angle of attack, α, provided in step 135. Generally, a larger angle of attack will provide more lift, up to a maximum angle of attack when the aircraft begins to stall.

Both $C_{L\alpha}$ and $C_{Lo}$ depend from for example Mach number, flap position, and the lifting properties of a particular wing/aircraft and are determined from the iterated Mach number and measured flap position via for example, lookup tables or equations. Flap position is provided in step 132. Flap position and Mach number, M, may be used to determine lift coefficient, $C_L$, using lookup tables based on historical flight data, for example. Flaps, which typically extend from the trailing edge of a wing, may be extended to different positions, including for example fully retracted, fully extended, and partially extended. Extending aircraft flaps may be used to increase lift for takeoff and landing.

In an example of step 130, a first lookup table is used to determine, $C_{L\alpha}$, based on M and flap position, and a second lookup table is used to determine, $C_{Lo}$, based on M and flap position. In an embodiment, $C_{L\alpha}$ may be constant, depending on the type of flap. Determining flap position may also include determining position of leading edge slats without departing from the scope hereof.

In step 135, the angle of attack (AOA), α, is provided for Equation 4. In an example of step 135, angle of attack is provided by an angle of attack indicator, such as an angle of attack vane or a multi-port probe.

In step 140, the true airspeed of the aircraft, $V_{true}$, is determined using Equation 5:

$$V_{true} = \sqrt{\frac{WN_z}{\cos(\alpha)\frac{1}{2}\rho C_L S}} \quad \text{Equation 5}$$

In Equation 5, W is an aircraft weight, $N_z$ is an aircraft load factor, cos(α) is a cosine of the aircraft angle of attack, ρ is an air density, $C_L$ is the lift coefficient, and S is a wing surface area. True airspeed, $V_{true}$, may be converted to Knots True Airspeed (KTAS) by converting from feet-per-second to nautical miles per hour (knots).

In step 141, air density, ρ, is determined using Equation 6:

$$\rho = \frac{P}{RT} \quad \text{Equation 6}$$

In Equation 6, P is pressure, R is the gas constant, and T is static air temperature. Static air temperature, T, is provided, as described above for step 115, either by direct measurement or optionally by a standard lookup table based on altitude provided in step 117.

In step 142, a pressure value is provided. In an example of step 142, pressure is measured using for example a static-pitot port. Alternatively, the pressure value is a standard pressure value provided from a standard lookup table of pressure for a given altitude, in which case altitude is provided in optional step 117, as described above.

In step 145, aircraft weight, W, is determined. In certain embodiments, a fixed average aircraft weight may be used for step 145. Alternatively, aircraft weight may be determined from an initial weight of the aircraft (e.g., step 146) and optionally updated during flight as aircraft weight decreases due to fuel burn (e.g., step 147).

In optional step 146, the initial weight is provided from the weight determined prior to takeoff. In an example of step 146, initial weight is determined based on the known empty aircraft weight plus the amount of fuel, number of passengers, weight of cargo onboard, etc.

In optional step 147, fuel burn data is provided for determining aircraft weight in step 145. In an example of step 147, fuel burn data is provided by the Full Authority Digital Engine Control (FADEC) system of the aircraft.

In step 148, the aircraft load factor, $N_Z$, is provided for calculating true airspeed in step 140 using Equation 5, where $N_Z$ is vertical acceleration divided by the gravitational constant.

In step 149, the wing surface area, S, is provided for calculating true airspeed using Equation 5.

In optional step 150, the impact pressure, $Q_C$, is determined using Equation 7:

$$Qc = Q\left[1 + \frac{M^2}{4} + \frac{M^4}{40} + \frac{M^6}{1600}\right] \quad \text{Equation 7}$$

In Equation 7, Q is the dynamic pressure and M is the Mach number. Impact pressure, $Q_C$, which is also known as dynamic pressure, is the total pressure (e.g., pitot pressure) minus static pressure.

In optional step 150, impact pressure, $Q_C$, is determined using the most recently updated Mach number from step 110. Dynamic pressure, Q, is defined by Equation 8:

$$Q = \frac{1}{2}\rho(V_{true})^2 \quad \text{Equation 8}$$

In Equation 8, ρ is air density (defined in Equation 6, above) and $V_{true}$ is the true airspeed determined in step 140 with Equation 5. FIGS. 16-20 show plots of dynamic pressure, Q, during different portions of flight, comparing measured Q with a synthetic Q, derived using method 100 or method 200 for example.

In optional step 160, a calibrated airspeed (CAS) is determined using Equation 9:

$$CAS = a_0\sqrt{5\left[\left(\frac{Qc}{P_o} + 1\right)^{\frac{2}{7}} - 1\right]} \quad \text{Equation 9}$$

In Equation 9, $a_0$ is a speed of sound at 15° C. and standard sea level atmospheric pressure, $Q_C$ is the impact pressure, and $P_0$ is a standard sea level atmospheric pressure (e.g., 101.3 kPa and 0% relative humidity). In an example of step 160, impact pressure, $Q_C$, is used to determine CAS according to Equation 9 and provide CAS to an airspeed indicator.

Following step 140, step 110 is repeated to determine an updated Mach number. Steps 110 through 140 of iterative loop 102 are repeated until the difference between successive updated Mach numbers becomes less than the predetermined threshold value, as determined in step 125. The resulting Mach number may require three or more iterations, for example, depending on the desired level of accuracy established by the predetermined threshold value (e.g., 0.01 Mach). Once the difference between successive updated Mach numbers becomes less than the predetermined threshold value, the most recently updated Mach number is considered the resulting Mach number, which is optionally reported in step 170. In an example of step 170, true airspeed is reported in step 405, FIG. 4.

Figure 9:
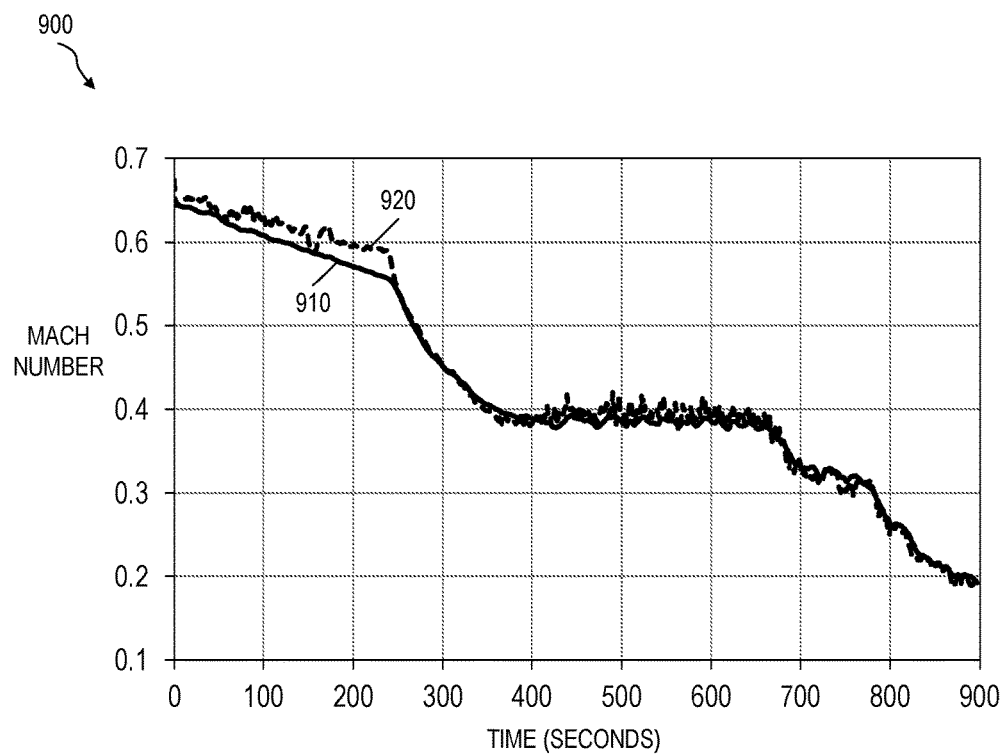
FIG. 9 is a plot showing a comparison between measured Mach number and synthetic Mach number derived using the method of FIG. 1 during a first cruising portion of a flight after climb out.
Figure 11:
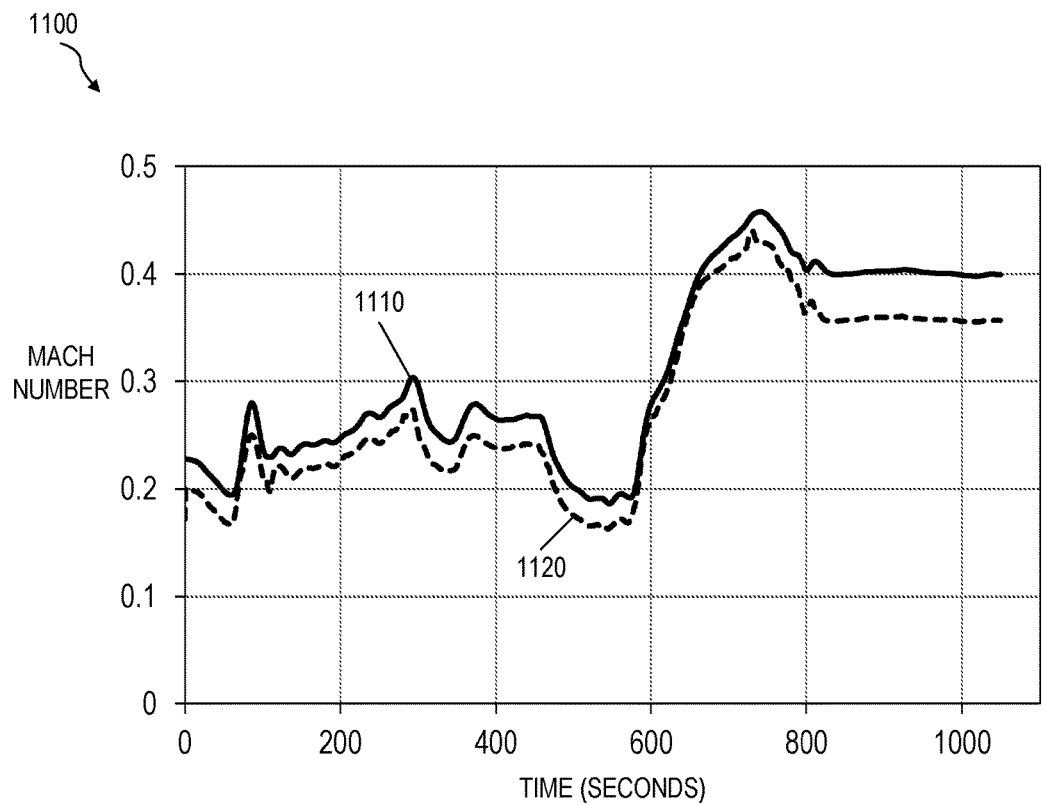
FIG. 11 is a plot showing a comparison between measured Mach number and synthetic Mach number derived using the method of FIG. 1 during a second cruising portion of a flight.
Figure 13:
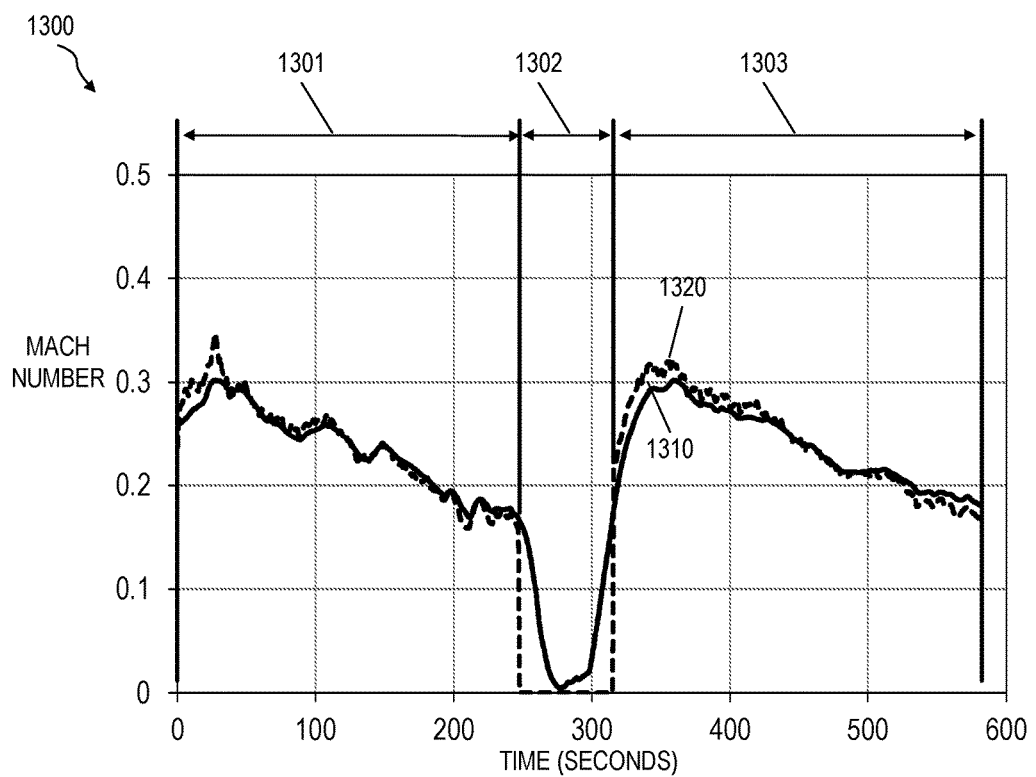
FIG. 13 is a plot showing a comparison between measured Mach number and synthetic Mach number derived using the method of FIG. 1 during a landing, touchdown, and takeoff flight sequence.

Changes in airspeed due to changing flight conditions require repeating method 100 to determine Mach number. Exemplary flight condition changes include, but are not limited to, weight reduction due to fuel consumption, flap position adjustments, altitude changes, load factor changes due to aircraft maneuvers, aircraft accelerations and decelerations, angle of attack changes, air temperature and static pressure changes, etc. In an embodiment, method 100 is repeated continuously during flight to update Mach number due to changing flight conditions. FIGS. 9, 11, and 13 show exemplary synthetic airspeeds determined using method 100 compared to measured airspeeds during aircraft maneuvers.

FIG. 2 is a block diagram of a method 200 for airspeed determination for aircraft using synthetic air data parameters. Method 200 is for example a control algorithm executed by an air data computer onboard the aircraft, similar to method 100 of FIG. 1, and further provides a nonlinear estimator that removes numerical instabilities, which may occur under certain flight conditions. As described below, method 200 determines airspeed by modeling aircraft lift and repeatedly updating dynamic pressure to converge to a stable airspeed value.

In initial dynamic pressure calculation 210, initial dynamic pressure, $Q_0$, is determined using Equation 11 to provide $Q_0$ 211. Equation 11 is determined by substituting Equation 8 into Equation 10 and rearranging:

$$Q_0 = \frac{WN_Z}{\cos(\alpha)C_L S} \qquad \text{Equation 11}$$

The left side of Equation 11 provides $Q_0$ 211, and the right side of Equation 11 includes the inputs of initial dynamic pressure calculation 210. Weight, W 245 and the aircraft load factor, $N_Z$ 248 are examples of steps 145 and 148 of FIG. 1, respectively. The product W×$N_Z$ 205, provides an effective weight that accounts for vertical acceleration. The product of $\cos(\alpha) \times C_L \times S$ 295, which is the product of the cosine of the calibrated aircraft angle of attack, $\cos(\alpha)$, the lift coefficient, $C_L$, and the wing surface area, S, is the denominator of Equation 11 provided from a lift model 290, described below.

In controller 220, dynamic pressure, Q, is determined. Inputs include effective weight W×$N_Z$ 205, and an effective lift L×$\cos(\alpha)$ 297 from lift model 290. Any difference between effective lift and effect weight during flight is accounted for with an error value, $\varepsilon$, as shown in Equation 12.

$$(W \times N_Z) - (L \times \cos(\alpha)) = \varepsilon \qquad \text{Equation 12:}$$

During each iteration of method 200, dynamic pressure, Q 228, is updated by controller 220 to minimize the error value, $\varepsilon$, of Equation 12. Q 228 is provided to lift model 290 and may be reported via reporting 299 in for example a cockpit flight display. An example of controller 220 is a feedback mechanism that includes a weighted sum of a proportional term and an integrator term, such that the proportional term adjusts Q in proportion to the magnitude of $\varepsilon$, and the integrator term adjusts Q in proportion to both the magnitude and the duration of $\varepsilon$ by integrating over time. The terms are weighted based on gains (e.g., coefficients), which may be tuned to provide a stable Q value with a minimal $\varepsilon$. The PI controller may be analog or digital without departing from the scope hereof.

In atmosphere calculation 230, air density, $\rho$ 241, is determined using Equation 6. Atmosphere calculation 230 is an example of step 141, FIG. 1. Temperature, T 215, is for example an absolute static air temperature, provided either by direct measurement or optionally by a standard lookup table as for step 115, FIG. 1. The standard lookup table is based on for example GPS-based altitude, via optional altitude 217. Pressure 242 is an example of step 142, FIG. 1 that provides atmospheric pressure, P, either by direct measurement using for example a static-pitot port, or using a standard lookup table for a given altitude.

In airspeed calculation 270, airspeed values are determined, including but not limited to true airspeed, $V_{true}$, calibrated airspeed, CAS, and Mach number, M. Using Equation 8, $V_{true}$ 240, is determined from dynamic pressure, Q 228, and air density, $\rho$ 241. $V_{true}$ 240 is reported via reporting 299.

CAS 260 is optionally determined using Equation 9 and reported via reporting 299. Equation 9 includes impact pressure, $Q_C$, determined using Equation 7 and optionally reported as $Q_C$ 250 via reporting 299. Equation 9 also includes dynamic pressure, Q 228, from controller 220, and Mach number, M 275.

Mach number, M 275, is determined using Equation 3, described above. M 275 is reported via reporting 299 and provided to lift model 290 via a switch 277. Switch 277 switches between an initial Mach number, $M_0$ 271, initially provided for lift model 290. The initial Mach number is for example 0.65 Mach, determined from historical flight data. Upon subsequent iterations of method 200 beyond the initial iteration, switch 277 switches to an updated Mach number, M 275.

Flaps, which typically extend from the trailing edge of a wing, may be extended to different positions, including fully retracted, fully extended, and partially extended, for example. Flap position 285 is optionally provided by for example sensors that determine a current position of the flaps, which is an example of step 132, FIG. 1. Extending flaps increases lift coefficient, $C_L$, of Equation 14, for example.

In lift model 290, aircraft lift, L, may be modeled based on effective lift, L×$\cos(\alpha)$, being approximately equal to effective weight, W×$N_Z$. Equation 10 combines with Equation 12 to form Equation 13:

$$W \times N_Z = L \times \cos(\alpha) = \cos(\alpha) \frac{1}{2} \rho V_{true}^2 C_L S \qquad \text{Equation 13}$$

Equation 13 includes lift coefficient, $C_L$, wing surface area, S 249, and the aircraft angle of attack, $\alpha$ 235. The lift coefficient, $C_L$, is dependent upon for example flap position 285 and Mach number 275 and may be determined as described for step 130, FIG. 1. With each iteration of method 200, dynamic pressure, $Q = \frac{1}{2}\rho(V_{true})^2$ (Equation 8), is updated via controller 220 to minimize the error value, $\varepsilon$, therefore balancing effective lift with effective weight in Equation 13. From lift model 290, $\cos(\alpha) \times C_L \times S$ 204 is provided to initial dynamic pressure calculation 210, and L×cos(α) 297 is provided to controller 220. Equation 13 may be rewritten as Equation 14 by substituting in Equation 8 and cancelling terms:

$$L = QC_L S \qquad \text{Equation 14:}$$

Figure 5:
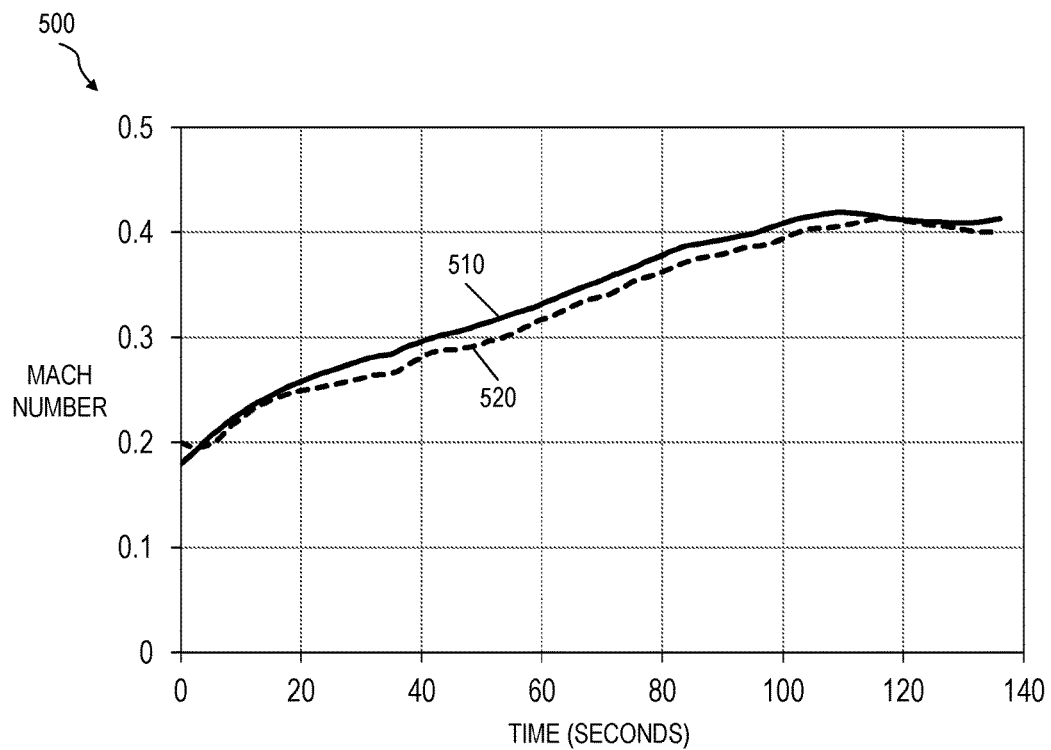
FIG. 5 is a plot showing a comparison between measured Mach number and synthetic Mach number derived using the method of FIG. 2 during a takeoff portion of a flight.
Figure 7:
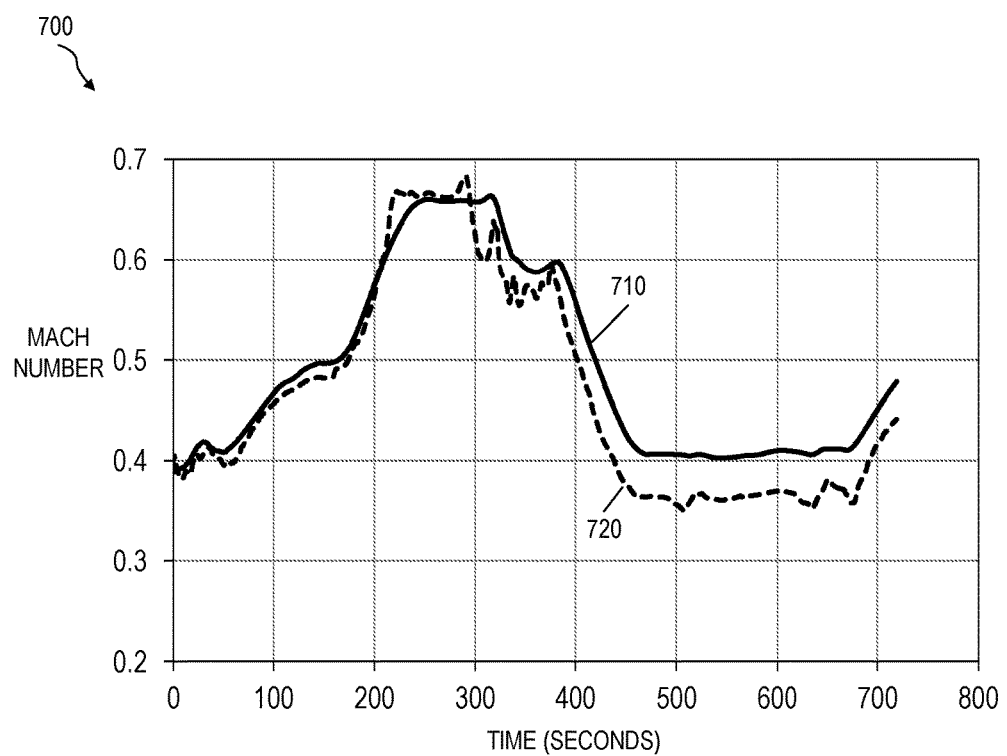
FIG. 7 is a plot showing a comparison between measured Mach number and synthetic Mach number derived using the method of FIG. 2 during a climb out portion of a flight after takeoff.

Following each iteration of method 200, the error value, ε, is decreased, and the dynamic pressure term, Q 228, stabilizes. As flight conditions change during flight, method 200 is continually repeated to determine airspeed values $V_{true}$ 240 and M 275 and optionally $Q_C$ 250 and CAS 260. FIGS. 5 and 7 show exemplary synthetic airspeeds determined using method 200 compared to measured airspeeds during aircraft maneuvers.

FIG. 3 is a block diagram showing steps of a method 300 to derive synthetic aircraft airspeed. Specifically, method 300 uses a horizontal control surface position, such as a horizontal stabilizer position, to determine a Mach number, a true airspeed, and a calibrated airspeed based on aircraft weight and center of gravity. Method 300 is for example executed by an air data computer onboard the aircraft. If airspeed is determined as invalid for any reason, such as a pitot-tube malfunction for example, method 300 is used to determine an estimated airspeed.

In optional step 310, an initial center of gravity is provided. In an example of optional step 310, the initial center of gravity is determined based on a known empty aircraft center of gravity plus an amount and location of fuel, passengers, cargo, etc.

In step 312, horizontal control surface position is provided. In an example of step 312, sensors located in the horizontal stabilizer provide position information. Horizontal control surface position may depend on flap position and/or elevator position in addition to horizontal stabilizer position without departing from the scope hereof.

In optional step 314, the aircraft center of gravity is determined using a "trim table". The trim table may include for example historical flight data relating center of gravity with stabilizer position (and optionally elevator position) for certain amounts of fuel. In an example of step 314, the aircraft center of gravity is determined, using the trim table, from the initial center of gravity provided in step 310, the position of the horizontal stabilizer provided in step 312, and fuel burn data provided in optional step 322.

In optional step 320, an initial weight of the aircraft is provided based on the weight prior to take off. Step 320 is an example of step 146 of FIG. 1.

In optional step 322, fuel burn data is provided for calculating aircraft weight in optional step 324. Step 322 is an example of step 147 of FIG. 1.

In optional step 324, aircraft weight is determined. Aircraft weight may be determined from the initial determined weight of the aircraft (from step 320) combined with the decrease in weight during flight due to fuel burn (from step 322). Step 324 is an example of step 145, FIG. 1. In certain embodiments, a fixed average aircraft weight may be used for step 324.

In optional step 330, altitude information is provided from for example GPS information.

In step 332, air density, ρ, is determined by direct measurement or using Equation 6. Step 332 is an example of step 141 of FIG. 1.

In step 336, dynamic pressure, Q, is determined using a "trim map". The trim map is a series of curves from historical flight data relating dynamic pressure with horizontal control surface position for a given air density (provided in step 332) and Mach number (provided in step 354).

The trim map may further include horizontal control surface position as a function of weight (provided in step 324) and/or center of gravity (provided in step 314). For a first iteration of method 300, an initial Mach number is provided in step 350. Step 350 is an example of step 271 of FIG. 2.

In step 340, the true airspeed of the aircraft, $V_{true}$, is determined from dynamic pressure, Q, using Equation 8. True airspeed is reported in step 341 via an airspeed indicator for example.

In step 350, an initial Mach number is provided. Step 350 is an example of step 101 of FIG. 1. In step 354, an updated Mach number is determined. During the first iteration of method 300, the updated Mach number is simply the initial Mach number provided in step 350. Upon subsequent iterations, the updated Mach number is determined from Equation 3, above. Step 354 is an example of step 110 of FIG. 1. In step 352, altitude information is provided from for example GPS information. Step 352 is an example of step 143 of FIG. 1. In step 355, an updated Mach number is reported via flight or avionics instruments for example.

In optional step 360, impact pressure, $Q_C$, is determined using Equation 7, above, with the most recently updated Mach number determined in step 354. Step 360 is an example of step 150 of FIG. 1.

In optional step 370, a calibrated airspeed (CAS) is determined. Step 370 is an example of step 160 of FIG. 1. In an example of step 370, CAS is determined using Equation 9, above, with the most recent impact pressure, $Q_C$, determined in step 360. In step 371, CAS is reported via an airspeed indicator for example.

Figure 4:
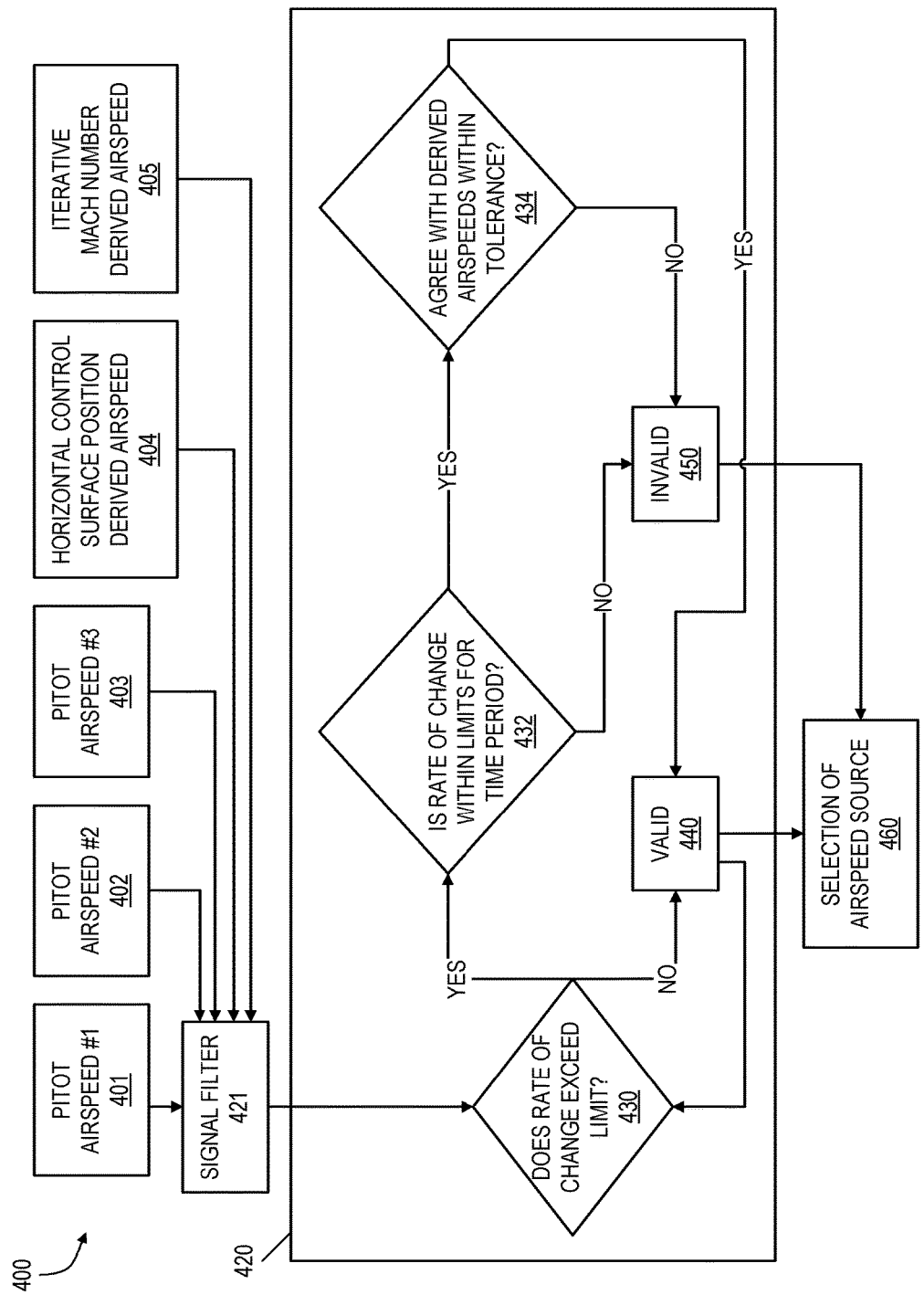
FIG. 4 is a diagram of a voting logic method to validate or invalidate air data sources, in an embodiment.
Figure 15:
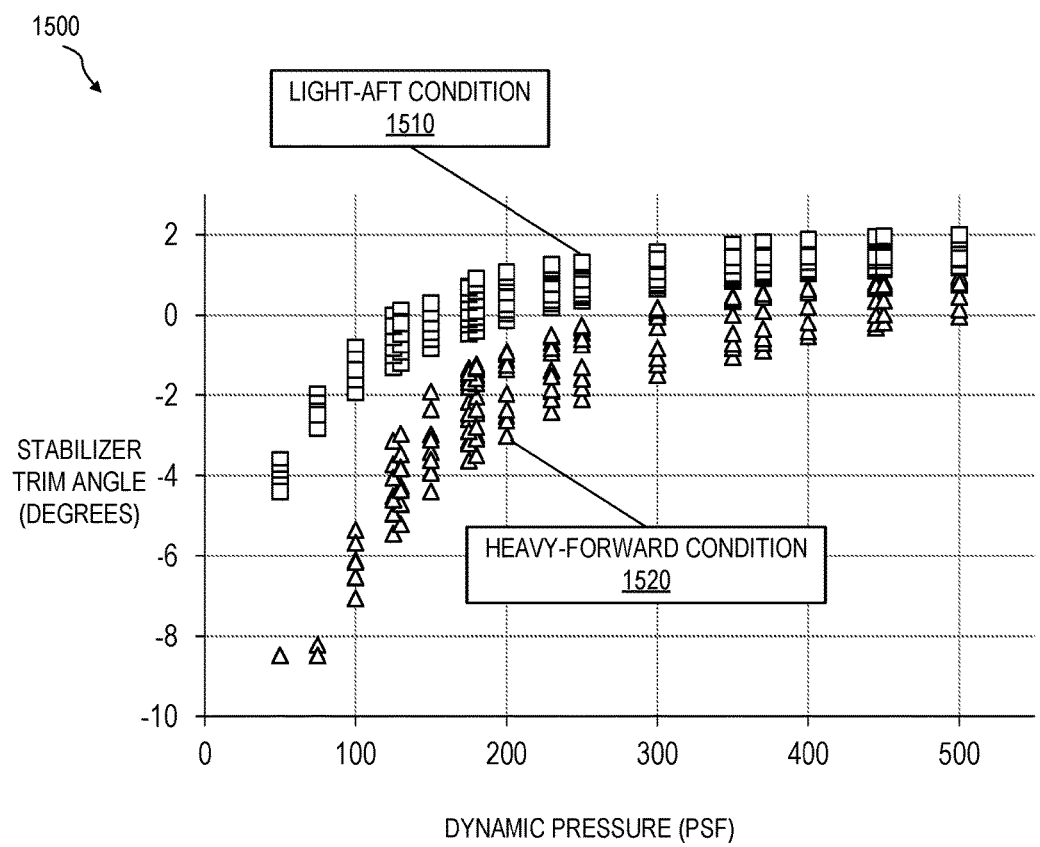
FIG. 15 illustrates dynamic pressure for different stabilizer trim angles using the method of FIG. 3, in an embodiment.

Method 300 is continually repeated during flight to provide current synthetic airspeed values, including true airspeed, Mach number, and optionally calibrated airspeed, and to report those values appropriately (e.g., step 404 of FIG. 4). Flight condition changes include, but are not limited to, weight reduction due to fuel consumption, center of gravity shifts due to fuel consumption, altitude changes, etc. Method 300 may Method 300 may estimate aircraft airspeed with less accuracy compared to method 100, but is sufficiently accurate to provide a backup airspeed value when preferred methods are not properly functioning. Plot 1500 of FIG. 15 illustrates exemplary dynamic pressure values determined using method 300 of FIG. 3 for different stabilizer trim angles, as described in detail below. True airspeed of the aircraft, $V_{true}$, is then determined from dynamic pressure, Q, using Equation 8 in step 340 of method 300, as described above.

FIG. 15 shows ranges of possible horizontal stabilizer trim positions in degrees versus dynamic pressure in pounds per square foot (psf) for two aircraft conditions that bound potential stabilizer trim angles: 1) a light-aft stabilizer condition 1510 shown with squares in FIG. 15, and 2) a heavy-forward stabilizer condition 1520 shown with triangles in FIG. 15. For conditions 1510, 1520, the terms light and heavy refer to aircraft weight, while the terms aft and forward refer to a position of center of gravity. The aircraft center of gravity is determined using a trim table in step 314 of method 300, as described above. Thus, light-aft stabilizer condition 1510 shows possible ranges of stabilizer angles for an aircraft flying in a light-weight mode, for example without passengers and cargo and with little fuel remaining. In the light-weight mode, the center of gravity is in an aft position compared to heavier flight conditions. Heavy-forward stabilizer condition 1520 shows possible ranges of stabilizer angles for aircraft flying in a heavy-weight mode with a forward center of gravity position, for example fully fueled with a maximum weight of passengers and cargo. Plot 1500 therefore shows ranges of possible stabilizer trim angles for an exemplary aircraft with all flaps fully retracted among a wide range of dynamic pressures. Other dynamic pressures and stabilizer trim angles are of course possible, for example due to different flap positions.

By providing redundant pitot-static systems, catastrophic failure of aircraft may be avoided by eliminating an invalid (e.g., faulty) airspeed value from a malfunctioning pitot-static system. However, some common mode failures may cause malfunction of all pitot-static systems onboard an aircraft, leading to catastrophic failure. To prevent this, airspeed values from dissimilar methods are desired, for example, synthetic airspeed values derived from air and aircraft parameters independently from pitot-static systems. Embodiments of the present disclosure derive such synthetic airspeed values from dissimilar methods 100, 200, and 300 of FIGS. 1, 2, and 3, respectively. In order for synthetic airspeed values to be useful, a rapid and automated decision process must be performed to decide invalid versus valid airspeed values.

FIG. 4 is a diagram showing steps of an exemplary voting logic method 400 for determining valid and invalid air data sources. Specifically, voting logic method 400 determines if primary pitot-static systems are operational and valid. If one or more primary sources are found to be invalid, voting logic method 400 determines which airspeed sources are valid. Voting logic method 400 includes a voting method 420 that uses an algorithm, described below, to decide whether an airspeed source is valid or invalid.

Voting method 420 receives airspeed information from a plurality of airspeed sources, including but not limited to pitot-tube airspeeds as well as synthetic airspeeds derived from air and aircraft parameters. For example, voting method 420 may receive a first pitot airspeed 401, a second pitot airspeed 402, a third pitot airspeed 403, a horizontal control surface position derived airspeed 404, and an iterative Mach number derived airspeed 405. First, second, and third pitot airspeeds 401-403 are for example redundant airspeeds provided by redundant pitot-tubes of conventional pitot-static systems. Horizontal control surface position derived airspeed 404 is an example of a synthetic airspeed derived using method 300 of FIG. 3. Iterative Mach number derived airspeed 405 is an example of a synthetic airspeed derived using method 100 of FIG. 1 or method 200 of FIG. 2.

In step 421, voting method 420 performs signal filtering to filter the airspeed signals. In an example of step 421, a simple low pass filter is used to remove high frequency variation in airspeed signals. In another example of step 421, a complimentary filter is used to filter signals, which incorporates inertial data with true airspeed rate of change.

In step 430, a decision is made as to whether an airspeed rate of change exceeds a limit. In an example of step 430, each pitot airspeed 401-403 is continually monitored, and a rate of change in airspeed during an aircraft maneuver is compared to predetermined rate limits defined by a physical capability of the aircraft to accelerate and decelerate. If in step 430, the airspeed rate of change exceeds a predetermined rate limit, voting method 420 proceeds to step 432 for further consideration. Otherwise, voting method 420 proceeds to step 440 and declares the pitot airspeed source valid.

In step 432, a decision is made as to whether a pitot airspeed rate of change that has exceeded a predetermined rate limit, as determined in step 430, returns to a rate below the limit (e.g., a normal rate) within a predetermined period of time. An example range of predetermined rate limits is 50 to 100 knots per second depending on the type of aircraft. If in step 432, the airspeed rate of change returns to a normal rate, voting logic method 420 proceeds to step 434 for further consideration. Otherwise, voting method 420 proceeds to step 450 and declares the pitot airspeed source invalid.

In step 434, a decision is made as to whether the pitot airspeed agrees with one or more derived airspeeds within a predetermined tolerance. If in step 434 the airspeed agrees with one or more derived airspeeds within the predetermined tolerance, such as 10 to 30 knots depending on the type of aircraft, for the predetermined period of time (as set forth in step 432), voting method 420 proceeds to step 440 and declares the airspeed source valid. Otherwise, voting method 420 proceeds to step 450 and declares airspeed source invalid. For example, a pitot-tube airspeed may be compared with horizontal control surface position derived airspeed 404 or with iterative Mach number derived airspeed 405.

Thus, airspeed values that exceed the rate of change limit in step 430 may be revalidated upon returning to within rate limits for the predetermined amount of time in step 432, upon agreeing, for that same time period, with one or more derived airspeed sources within the predetermined tolerance in step 434.

In step 440, airspeed sources are declared valid. In step 450, airspeed sources are declared invalid. For example, voting method 420 may determine if one pitot-static airspeed system is in error by comparing to the other pitot-static systems and the derived airspeeds. A common mode failure of the pitot-static system, such as icing of all pitot probes or exposure to volcanic ash, may cause the pitot airspeeds 401, 402, 403 to be in error, which may be determined by voting method 420, if for example, all pitot-static airspeed systems agree with each other but disagree with the derived airspeeds.

In step 460, an airspeed source is selected for providing airspeed information to pilots and other aircraft systems. In an example of step 460, a valid airspeed source is selected to provide airspeed information to an airspeed indicator. In an embodiment, the derived airspeed sources 404, 405 may be used by voting method 420 for the purpose of validating pitot airspeeds 401, 402, 403 but are not selected in step 460 unless all pitot airspeeds 401, 402, 403 are declared invalid in step 450.

FIGS. 5-14 include plots showing Mach number comparisons for measured flight data versus synthetic data derived using either method 100, FIG. 1 or method 200, FIG. 2. FIGS. 5, 7, 9, 11, and 13, show Mach number versus time in seconds for measured versus synthetic flight data. FIGS. 6, 8, 10, 12, and 14, show the absolute value of a difference (Δ) in Mach number between measured and synthetic flight data for FIGS. 5, 7, 9, 11, and 13, respectively, compared to a predetermined limit of 0.1 Δ Mach. FIGS. 5-14 show agreement between the synthetic Mach number values and the measured Mach number values within 0.1 Δ Mach during different stages of test flights.

FIG. 5 shows a Mach number comparison plot 500 during a takeoff portion of a flight, beginning immediately after liftoff. The solid line 510 shows measured Mach number and the dashed line 520 shows synthetic Mach number derived using method 200, FIG. 2.

Figure 6:
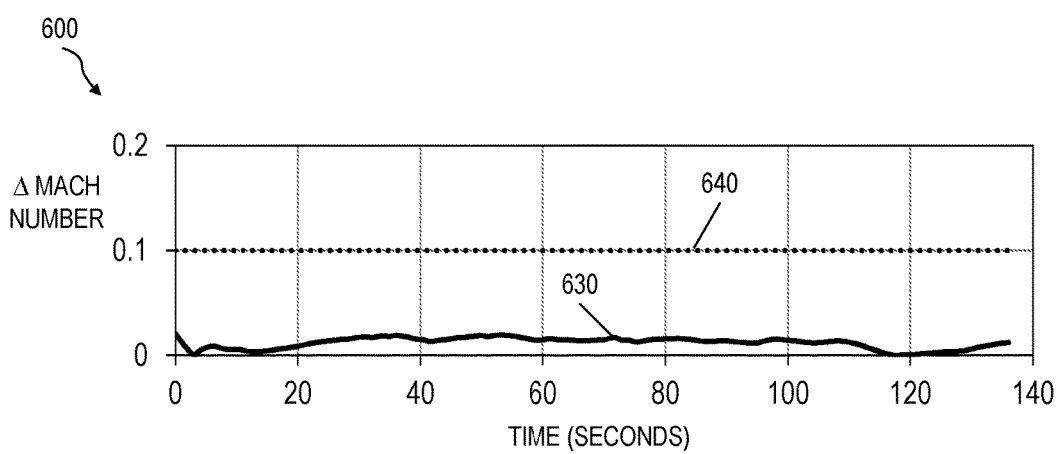
FIG. 6 is a plot showing a difference between the measured and synthetic Mach numbers of FIG. 5.

FIG. 6 shows a difference plot 600 for the absolute difference (Δ) in Mach number 630 between measured Mach number 510 and synthetic Mach number 520 of FIG. 5 compared to the predetermined limit of 0.1 Δ Mach shown with dotted line 640. Note that the difference remains below 0.1 Δ Mach throughout the takeoff portion of the flight.

FIG. 7 shows Mach number comparison plot 700 during a climb out portion of a flight after takeoff. The solid line 710 shows measured Mach number and the dashed line 720 shows synthetic Mach number derived using method 200, FIG. 2.

Figure 8:
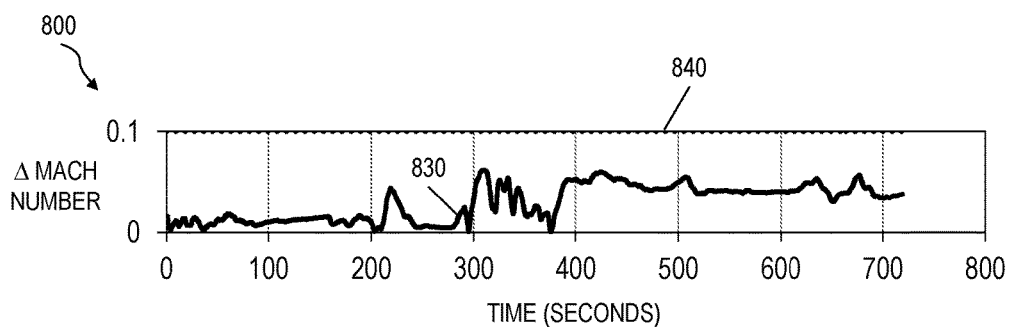
FIG. 8 is a plot showing a difference between the measured and synthetic Mach numbers of FIG. 7.

FIG. 8 shows a difference plot 800 for the difference (Δ) in Mach number 830 between measured Mach number 710 and synthetic Mach number 720 of FIG. 7 compared to the predetermined limit of 0.1 Δ Mach shown with dotted line 840. Note that the difference remains below 0.1 Δ Mach throughout the climb out portion of the flight.

FIG. 9 shows Mach number comparison plot 900 during a first cruising portion of a flight after climb out. The solid line 910 shows measured Mach number and the dashed line 920 shows synthetic Mach number derived with method 100, FIG. 1.

Figure 10:
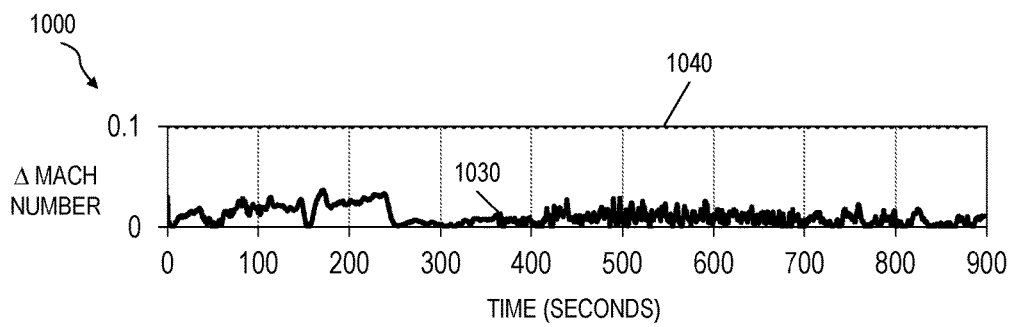
FIG. 10 is a plot showing a difference between the measured and synthetic Mach numbers of FIG. 9.

FIG. 10 shows a difference plot 1000 for the difference (Δ) in Mach number 1030 between measured Mach number 910 and synthetic Mach number 920 of FIG. 9 compared to the predetermined limit of 0.1 Δ Mach shown with dotted line 1040. Note that the difference remains below 0.1 Δ Mach throughout the first cruising portion of the flight.

FIG. 11 shows Mach number comparison plot 1100 during a second cruising portion of a flight. The solid line 1110 shows measured Mach number and the dashed line 1120 shows synthetic Mach number derived using method 100, FIG. 1.

Figure 12:
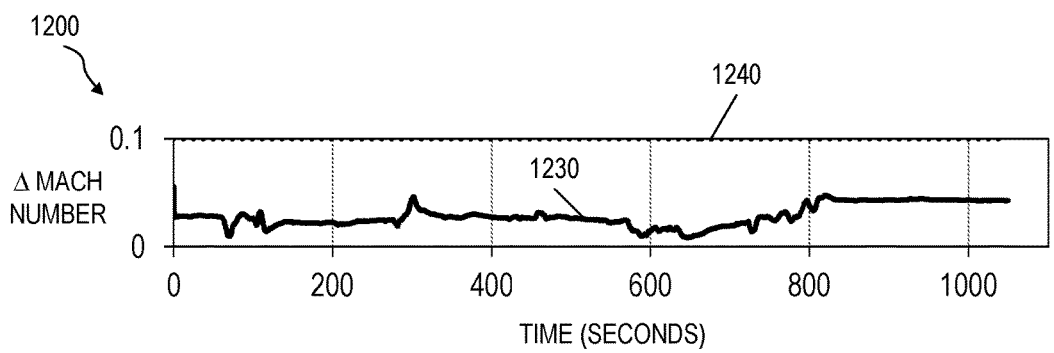
FIG. 12 is a plot showing a difference between the measured and synthetic Mach numbers of FIG. 11.

FIG. 12 shows a difference plot 1200 for the difference (Δ) in Mach number 1230 between measured Mach number 1110 and synthetic Mach number 1120 of FIG. 11 compared to the predetermined limit of 0.1 Δ Mach shown with dotted line 1240. Note that the difference remains below 0.1 Δ Mach throughout the second cruising portion of the flight.

FIG. 13 shows Mach number comparison plot 1300 during a landing, touchdown, and takeoff flight sequence. The solid line 1310 shows measured Mach number and the dashed line 1320 shows synthetic Mach number derived using method 100, FIG. 1. Plot 1300 includes three time segments that correspond to landing 1301, touchdown 1302, and takeoff 1303, respectively. Methods 100, 200, and 300 operate only during flight, not during touchdown. Accordingly, in plot 1300 measured Mach number 1310 and synthetic Mach number 1320 closely match during landing 1301 and takeoff 1303 segments of the flight sequence, but not during touchdown 1302 where the measured Mach number gradually decreases to zero while the synthetic Mach number is instantly set to zero.

Figure 14:
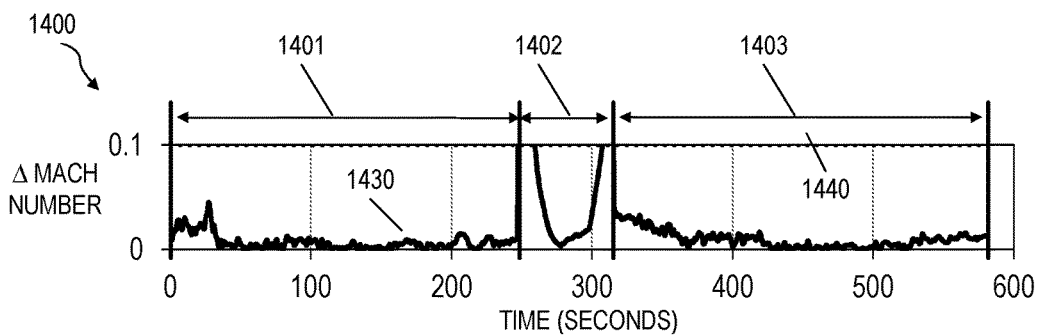
FIG. 14 is a plot showing a difference between the measured and synthetic Mach numbers of FIG. 13.

FIG. 14 shows a difference plot 1400 for the difference (Δ) in Mach number 1430 between measured Mach number 1310 and synthetic Mach number 1320 of FIG. 13 compared to the predetermined limit of 0.1 Δ Mach shown with dotted line 1440. Note that the difference remains below 0.1 Δ Mach during a landing segment 1401 and a takeoff segment 1403, but not during a touchdown segment 1402. Segments 1401, 1402, and 1403 correspond with segments 1301, 1302, and 1303 of FIG. 3, respectively. FIG. 15 illustrates dynamic pressure for different stabilizer trim angles using the method of FIG. 3, in an embodiment.

FIGS. 16-20 include plots showing dynamic pressure in pounds per square-foot (PSF) for measured flight data and synthetic data derived using either method 100, FIG. 1 or method 200, FIG. 2. FIGS. 16-20 show general agreement between the synthetic dynamic pressure values and the measured dynamic pressure values during different stages of test flights.

Figure 16:
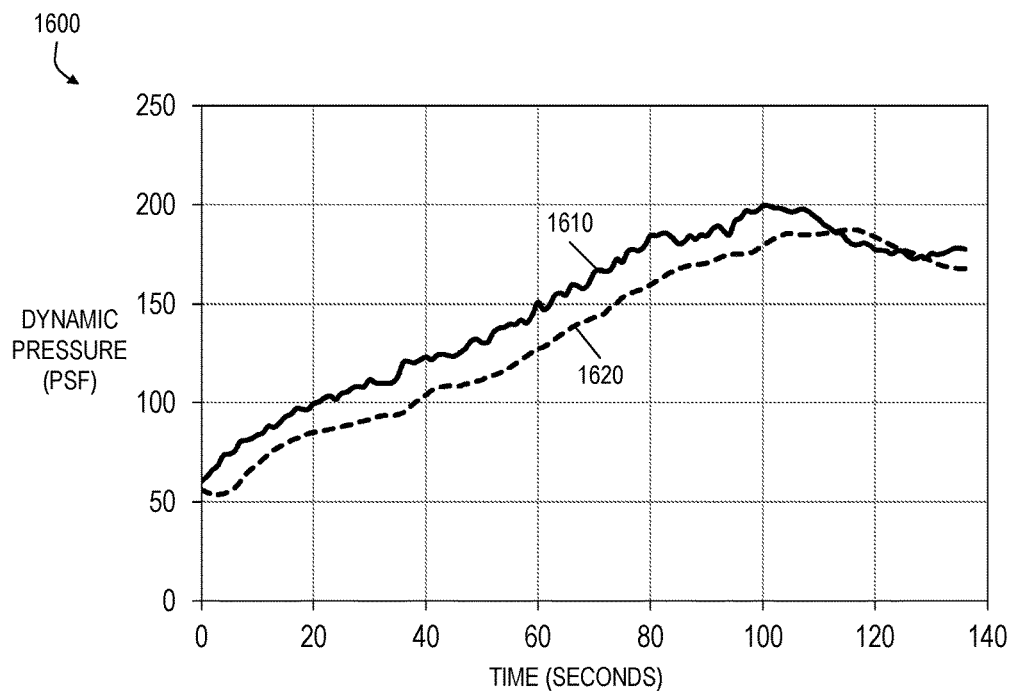
FIG. 16 is a plot showing a comparison between measured dynamic pressure and synthetic dynamic pressure derived using the method of FIG. 2 during a takeoff portion of a flight.

FIG. 16 shows a dynamic pressure comparison plot 1600 during the takeoff portion of flight corresponding to the Mach number comparison plot 500, FIG. 5. The solid line 1610 shows measured dynamic pressure and the dashed line 1620 shows synthetic dynamic pressure derived using method 200, FIG. 2.

Figure 17:
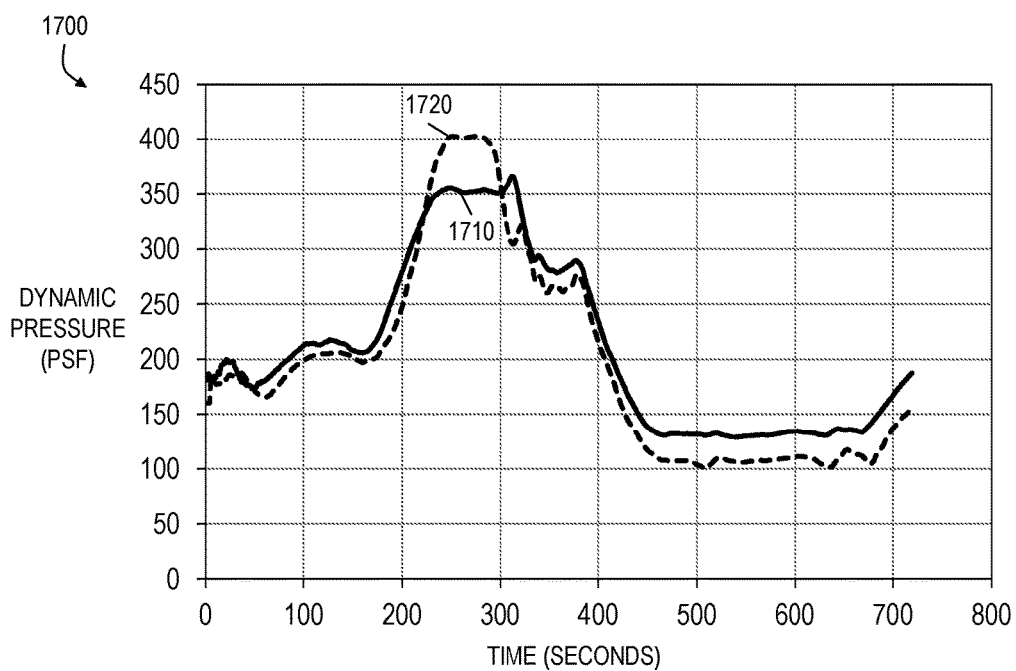
FIG. 17 is a plot showing a comparison between measured dynamic pressure and synthetic dynamic pressure derived using the method of FIG. 2 during a climb out portion of a flight after takeoff.

FIG. 17 shows a dynamic pressure comparison plot 1700 during the climb out portion of flight after takeoff corresponding to the Mach number comparison plot 700, FIG. 7. The solid line 1710 shows measured dynamic pressure and the dashed line 1720 shows synthetic dynamic pressure derived using method 200, FIG. 2.

Figure 18:
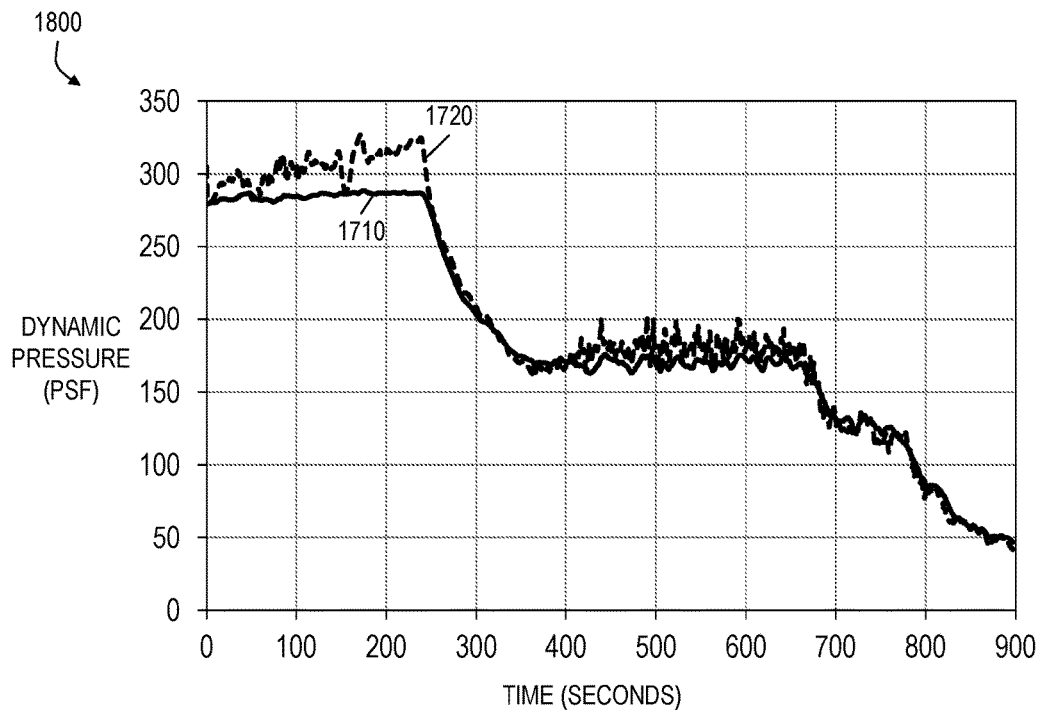
FIG. 18 is a plot showing a comparison between measured dynamic pressure and synthetic dynamic pressure derived using the method of FIG. 1 during a first cruising portion of a flight after climb out.

FIG. 18 shows a dynamic pressure comparison plot 1800 during the first cruising portion of flight after climb out corresponding to the Mach number comparison plot 900, FIG. 9. The solid line 1810 shows measured dynamic pressure and the dashed line 1820 shows synthetic dynamic pressure derived using method 100, FIG. 1.

Figure 19:
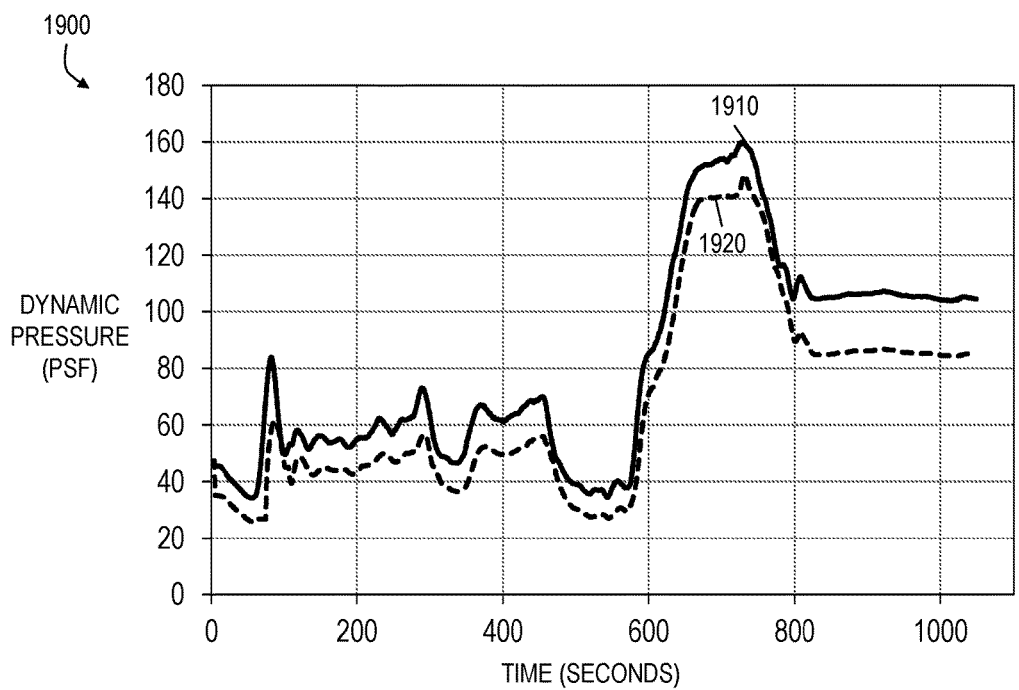
FIG. 19 is a plot showing a comparison between measured dynamic pressure and synthetic dynamic pressure derived using the method of FIG. 1 during a second cruising portion of a flight.

FIG. 19 shows a dynamic pressure comparison plot 1900 during the second cruising portion of flight corresponding to the Mach number comparison plot 1100, FIG. 11. The solid line 1910 shows measured dynamic pressure and the dashed line 1920 shows synthetic dynamic pressure derived using method 100, FIG. 1.

Figure 20:
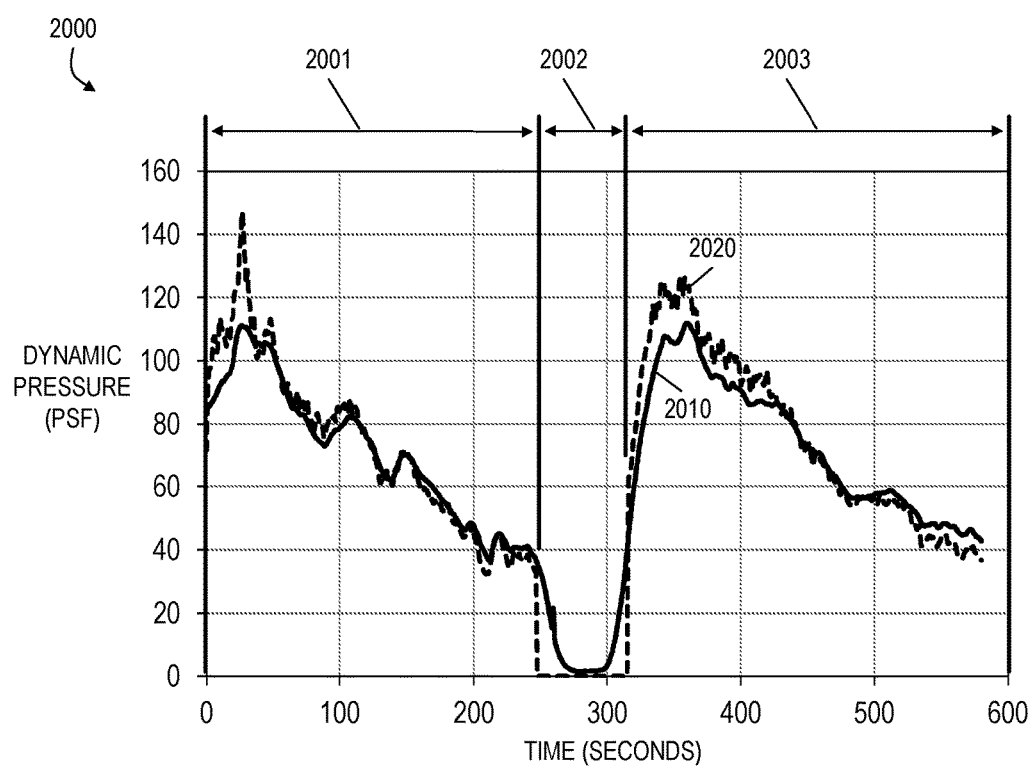
FIG. 20 is a plot showing a comparison between measured dynamic pressure and synthetic dynamic pressure derived using the method of FIG. 1 during a landing, touchdown, and takeoff flight sequence.

FIG. 20 shows a dynamic pressure comparison plot 2000 during the landing, touchdown, and takeoff flight sequence corresponding to the Mach number comparison plot 1300, FIG. 13. The solid line 2010 shows measured dynamic pressure and the dashed line 2020 shows synthetic dynamic pressure derived using method 100, FIG. 1. Methods 100, 200, and 300 operate only during flight, not during touchdown. Accordingly, in plot 2000 measured dynamic pressure 2010 and synthetic dynamic pressure 2020 closely match during landing 2001 and takeoff 2003 segments of the flight sequence, but not during touchdown 2002 where the measured dynamic pressure gradually decreases to zero while the synthetic dynamic pressure is instantly set to zero.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A method for aircraft airspeed determination, comprising:
   providing a Mach number;
   performing an iteration, comprising:
      determining a lift coefficient from the Mach number, a flap position, and an angle of attack;
      determining a weight of the aircraft;
      determining an air density based on a pressure;
      determining a true airspeed based on the lift coefficient, the weight, the air density, a load factor, and a wing surface area;
      determining an updated Mach number based on the true airspeed and a static air temperature;

comparing a difference between the Mach number and the updated Mach number to a predetermined threshold;

repeating the steps of the iteration until the difference is less than the predetermined threshold; and determining a resulting Mach number based on the updated Mach number of the iteration.

2. The method of claim 1, wherein the air density is determined from a measured static air temperature and a measured pressure using a pitot-static system.

3. The method of claim 1, wherein the air density is determined from a standard static air temperature and a standard pressure based on an altitude.

4. The method of claim 1, further comprising determining a calibrated airspeed based on the true airspeed and an impact pressure, wherein the impact pressure is determined from the updated Mach number and the air density.

5. A method for aircraft airspeed determination, comprising:

determining an initial dynamic pressure from a weight, a load factor, a wing surface area, an angle of attack, and a lift coefficient of the aircraft;

determining a lift of the aircraft based on the wing surface area, the angle of attack, the lift coefficient, and the initial dynamic pressure;

determining an error value based on a difference between the lift and the weight;

determining an updated dynamic pressure that reduces the error value;

repeating the steps of determining the lift, determining the error value, and determining the updated dynamic pressure until the error value is less than a predetermined threshold; and determining aircraft airspeed based on the updated dynamic pressure and an air density.

6. The method of claim 5, wherein the initial dynamic pressure is determined using a lift coefficient that is determined from a lookup table based on a flap position and an initial Mach number.

7. The method of claim 6, wherein the initial Mach number is updated from the aircraft airspeed and a static air temperature to determine an updated Mach number.

8. The method of claim 7, further comprising updating the lift coefficient based on the updated Mach number.

9. The method of claim 7, further comprising determining a calibrated airspeed based on an impact pressure, wherein the impact pressure is determined from the updated dynamic pressure and the updated Mach number.

10. A method for aircraft airspeed determination, comprising:

determining at least one horizontal control surface position;

determining a Mach number based on an initial Mach number and an altitude;

determining a dynamic pressure based on an air density, the Mach number, and the at least one horizontal control surface position;

determining an airspeed based on the dynamic pressure; and determining an updated Mach number based on the airspeed.

11. The method of claim 10, wherein the step of determining the dynamic pressure is repeated based on the updated Mach number to determine an updated dynamic pressure.

12. The method of claim 10, wherein the step of determining the airspeed is repeated based on the updated dynamic pressure.

13. The method of claim 10, wherein the steps of determining the dynamic pressure, determining the airspeed, and determining the updated Mach number are repeated until the airspeed converges to a stable value.

14. The method of claim 10, further comprising determining a weight of the aircraft and a center of gravity.

15. A method to determine an airspeed for an aircraft, comprising:

providing at least one measured airspeed determined from a pitot-tube;

providing a derived airspeed; and determining a valid airspeed from the at least one measured airspeed and the derived airspeed.

16. The method of claim 15, further comprising providing a derived airspeed from a horizontal control surface position, a dynamic pressure, and an initial Mach number.

17. The method of claim 15, wherein the step of determining a valid airspeed comprises:

determining an airspeed rate of change during an aircraft maneuver;

comparing the airspeed rate of change with a limit for a normal airspeed rate of change; and determining whether an airspeed source is valid or invalid based on the airspeed rate of change and the limit.

18. The method of claim 15, further comprising determining an invalid airspeed source.

19. The method of claim 18, further comprising determining that the invalid airspeed source is no longer invalid, thereby becoming a valid airspeed source.

20. The method of claim 19, determining that the invalid airspeed source is no longer invalid comprising:

determining that the airspeed rate of change returned within the limit for a first period of time;

determining that the invalid airspeed source agrees with the derived airspeed for a second period of time; and changing the invalid airspeed source to a valid airspeed source based on the airspeed rate of change returning to within the limit for the first period of time and the invalid airspeed source agreeing with the derived airspeed for the second period of time.

\* \* \* \* \*